K. EDAHL.
SHOCK RESISTING MECHANISM.
APPLICATION FILED FEB. 7, 1914.
1,221,428.
Patented Apr. 3, 1917.
4 SHEETS—SHEET 1.
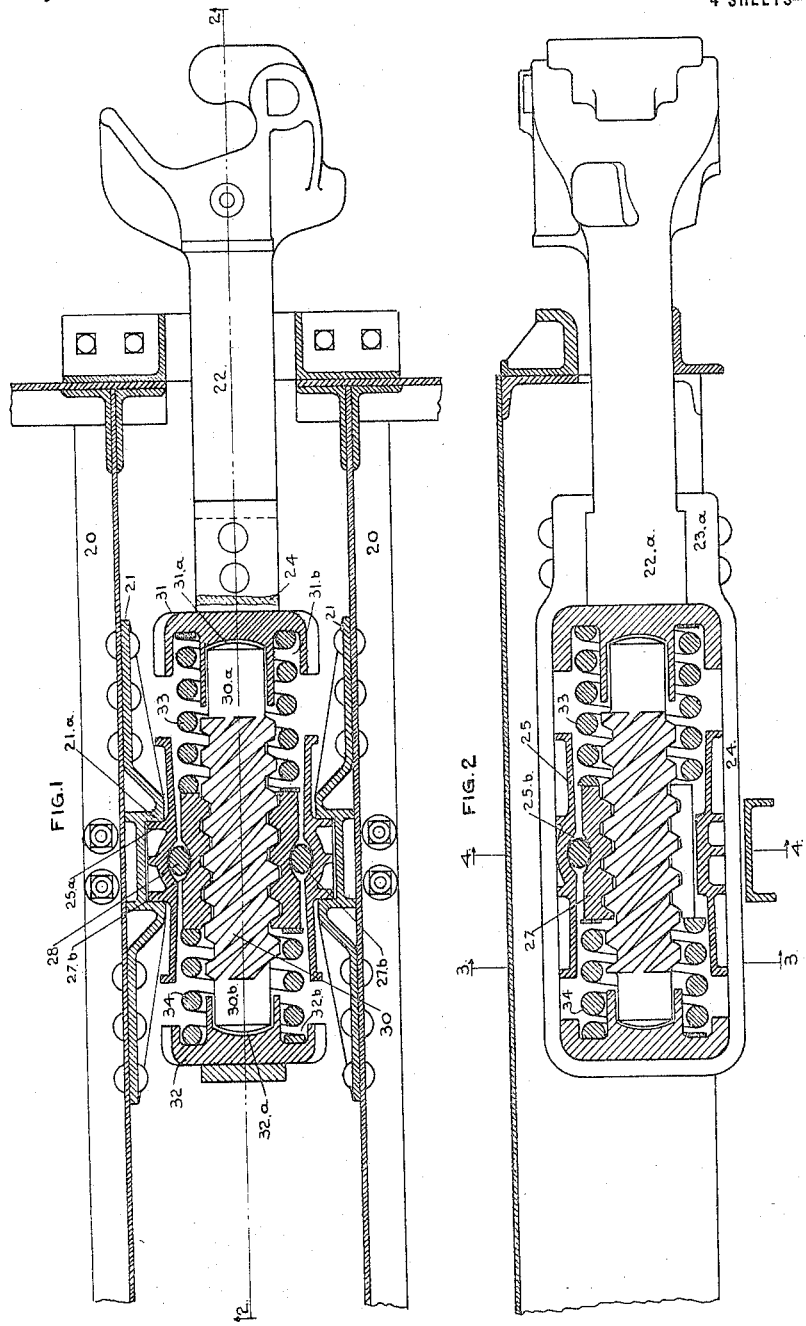
WITNESSES
Edythe M. Anderson.
Helen D. Freund.
INVENTOR
Knute Edahl
BY Sheridan, Wilkinson & Scott
ATTORNEY K. EDAHL.
SHOCK RESISTING MECHANISM.
APPLICATION FILED FEB. 7, 1914.
1,221,428.
Patented Apr. 3, 1917.
4 SHEETS—SHEET 2.
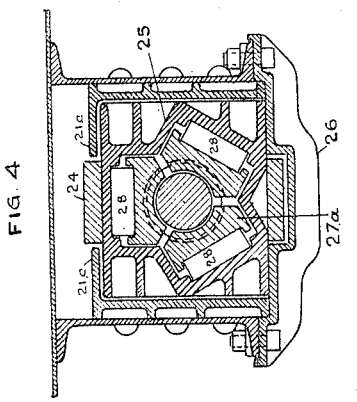
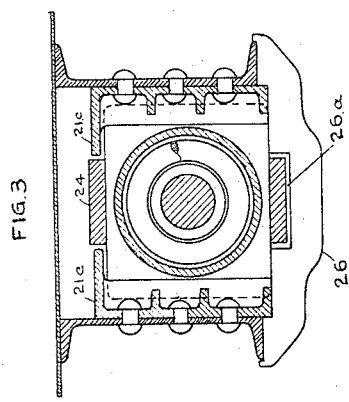
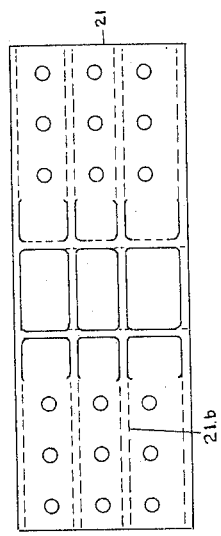
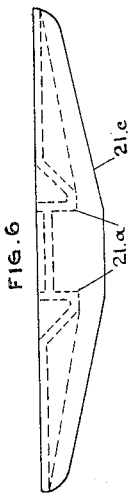

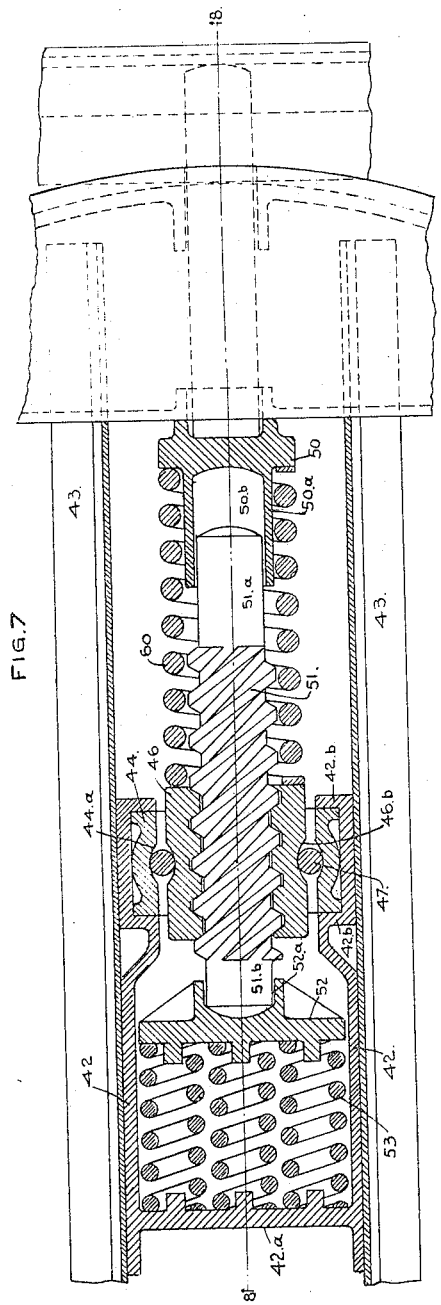

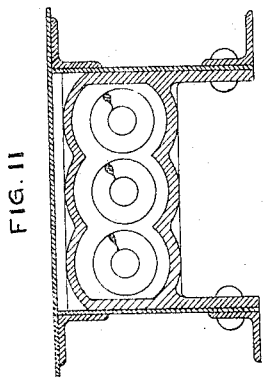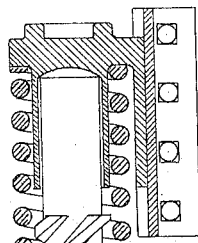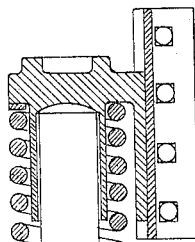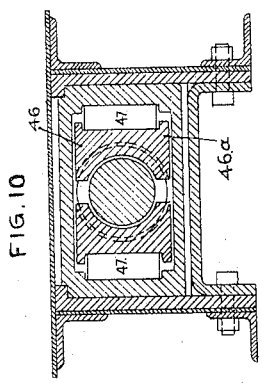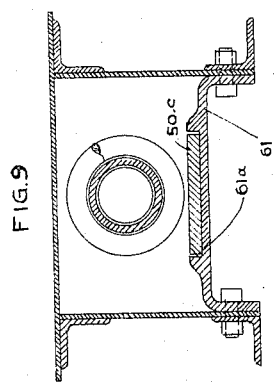

UNITED STATES PATENT OFFICE.

KNUTE EDAHL, OF CHICAGO, ILLINOIS.

SHOCK-RESISTING MECHANISM.

1,221,428.

Specification of Letters Patent.   Patented Apr. 3, 1917.

Application filed February 7, 1914.  Serial No. 817,147.

*To all whom it may concern:*

Be it known that I, KNUTE EDAHL, a citizen of the United States, residing at Chicago, in the county of Cook and State of Illinois, have invented certain new and useful Improvements in Shock-Resisting Mechanism, of which the following is a specification.

This invention relates to improvements in shock resisting mechanisms and has for its object to provide a new and improved device of this character which is adapted for use with railway cars or the like.

It is well known that many devices exist to resist the sudden shocks transmitted from one car to another in a train, either in starting or stopping, and the main object of my invention is to provide a mechanism for this purpose which will meet such a shock, for example, incident to the pushing together of two cars, by providing first, a comparatively slight resistance, then a comparatively greater resistance, and finally adding thereto still more resistance whereby the shock is gradually diminished in a comparatively limited movement.

Another object is to provide a shock resisting mechanism which will not only absorb or minimize the shock of pushing or pulling but will absorb the recoil or return to normal position after the original movement or shock.

Still another object of my invention is to provide a device for this purpose which will be easy to assemble and attach, and which may be readily removed and disassembled as will be apparent from my following specification and the accompanying drawings.

Another object is to provide an improved arrangement of cheek-plates and yoke-seating and supporting means.

Still other objects will be set forth and shown in the following specification and accompanying drawings, in which;

Figure 1 is a horizontal section through an embodiment of my invention showing the same as embodied in a draft gear;

Fig. 2 is a section along the line 2—2 of Fig. 1, the yoke and draw-bar mechanism being shown in elevation;

Fig. 3 is a transverse section along the line 3—3 of Fig. 2;

Fig. 4 is a similar section along the line 4—4 of Fig. 2;

Fig. 5 is a front elevation of the cheek plate shown in Fig. 1;

Fig. 6 is a plan view of the same;

Fig. 7 is a horizontal section showing my invention applied to a buffer construction;

Fig. 8 is a section along the line 8—8 of Fig. 7;

Figs. 9, 10 and 11 are transverse sections along the lines 9—9, 10—10, 11—11 of Fig. 8, respectively;

Fig. 12 is a view similar to Fig. 8 showing the location of the elements after movement of the buffer and plate a portion of its travel;

Fig. 13 is a view similar to Fig. 12 after further movement of the buffer plate in the same direction.

Like numerals refer to like elements throughout the drawings, in which;

20 designates draft sills or equivalent members of a car, to the inner sides of which are secured the cheek plates 21, (see Figs. 5 and 6) these cheek plates being provided with the inwardly extending shoulders or lugs 21$^a$ and the reinforcing ribs 21$^b$ extending therefrom to the ends of the plates, as shown for example in Fig. 5. Extending inwardly between the spaced apart draft sills 20 is the usual form of draw-bar 22 having its butt 22$^a$ secured to and between the jaws 23$^a$ of the yoke 24. What I term a casing 25 is located between the cheek plates 21, this casing being provided with the outwardly extending shoulder portions 25$^a$ adapted to fit between and engage the lugs 21$^a$, as shown in Fig. 1. This casing 25 is prevented from moving upwardly between the draft sills 20 by the upper flanges 21$^c$ of the cheek plates 21, these flanges being extended over the top of the casing 25 to lie closely adjacent the upper portion of the yoke 24. The casing 25 is prevented from moving downwardly out of position by the strap 26 extending across between and secured to the draft sills 20, this strap being grooved or depressed at 26$^a$ to fit around the lower portion of the yoke 24, as shown in Figs. 3 and 4, for example. The flanges 21$^c$ and seat or groove 26$^a$ are arranged to permit sufficient swing or lateral movement of the yoke. The shoulder portions 25$^a$ of the casing 25 are shown as constructed of a number of integral ribs, this construction providing strength and lightness, since, as will be explained later, a considerable side stress may be imparted under certain conditions through these shoulder portions to the draft sills. On its interior the casing 25 is provided with the grooves or seats 25$^b$ for a purpose to be hereinafter described, these grooves being pushed out as shown in Figs. 1 and 2, for example. Movably mounted in the casing 25 is what I term a female member generally indicated by numeral 27, this female member preferably being formed in a plurality of segments 27$^a$, each of these segments being internally threaded and coacting with the others. These female members are each provided with a dished-out groove 27$^b$ similar to the groove 25$^b$ of the casing 25 and normally located adjacent thereto, each pair of grooves 25$^b$—27$^b$ providing a race for rollers 28, these races converging adjacent each end thereof, as is clearly shown in the drawings. The rollers 28 are constructed in the embodiment shown, of an elliptic or non-circular contour for a purpose to be hereinafter described. Projecting through and engaging the threaded female member 27 is the screw member 30 having a thread of pitch corresponding to that of the female member and constructed with smooth cylindrical ends 30$^a$, 30$^b$, as shown in Fig. 1, for example. Followers 31—32 are located at the respective ends of the screw member 30 and are socketed at 31$^a$, 32$^a$, respectively, to engage and permit movement of the ends 30$^a$, 30$^b$ therein. Each of these followers is provided with the inwardly facing groove or seat 31$^b$, 32$^b$, respectively, and coiled springs 33—34 are seated therein and abut against the respective followers, these springs being coiled around the screw member 30 and having their other ends abutting against the respective ends of the female member 27. These followers 31—32 are mounted in the respective ends of the yoke 24 to move therewith.

To enable those skilled in the art to understand thoroughly the construction and operation of my device, I will describe in detail such operation. Assuming that a shock is imparted to the draw-bar 22 to force the same inwardly of the car, the yoke 24 will move inwardly therewith operating to carry the follower 31 with it. This will, by means of the construction shown, move a slight distance relative to the end 30$^a$, of the screw member, this movement being resisted by the action of the spring 33. When this slight movement has taken place, the screw member 30$^a$ is carried or forced inwardly carrying at first the female member 27 therewith. As the latter moves relative to the casing 25, however, the rollers 28 rotating about their axes and being of an elliptical contour, they will serve to introduce a wedge action between the female member and the casing and will limit and resist the movement of the female member 27 relative to the casing 25, the convergence of their races also contributing to enhance this wedge effect. At the same time the segments 27$^a$ of the female member 27 are, by means of this wedge action, pressed tightly against the screw member 30 and upon cessation of the movement of the female member 27, further movement of the draw-bar in the same direction will operate to cause the member 30 to be screwed or twisted through the female member 27. This screwing movement will be resisted by the well-known relation existing between screw threads, due to the resolution of forces, and frictional contact of the female member 27$^a$ with the screw member 30 will also greatly resist the further movement of this screw member, and it is apparent that as the same is advanced farther and farther by means of the shock imparted to the draw-bar, the wedging action of the rollers 28 will be increased, and the frictional contact mentioned above will be increased accordingly. Upon removal of the push imparted to the draw-bar 22, the spring 33 which has become compressed during this inward movement of the mechanism will operate to return the draw-bar, yoke and follower 31 to neutral or rest position, the female member 27$^a$ at the same time, or previous thereto, resuming its rest position and greatly decreasing the resistance to the relative movement of the screw member 30 and female member 27.

It will be apparent that from the well known characteristic of the screw, this return movement will be comparatively gradual, the recoil being in effect absorbed by the screw member and female member. This is an important feature of my construction.

In the event that a sudden shock operates to draw the draw-bar 22 outwardly, this shock will be resisted in the same manner through the medium of follower 32, spring 34 and the female member 27 and screw member 30, as described in connection with the reverse movement of the draw-bar. By interposing increasing resistance in this manner, the shock may be absorbed with a comparatively limited range of travel of the draw-bar, as will be apparent to those skilled in the art.

As in the case of the pushing in of the draw-bar, when the force causing the drawing out of the draw-bar has ceased the recoil will be absorbed and the return of the mechanism to normal will be gradual.

It is to be noted that I have provided for more travel in resisting the buffing or pushing force than in resisting the drawing force by constructing the spring space for spring 33 longer and by also making the spring itself longer. I further provide for this excess of travel in one direction by spacing one end of casing sleeve a greater distance from follower 31 than the other end is spaced from follower 32. (See Fig. 1.)

In Figs. 7 to 13 I have shown my invention as applied to a buffer mechanism, the main difference being that with this form of mechanism, the shock is all in one direction and occurs upon pushing together of adjacent cars. Numeral 40 designates generally the buffer plate having the rearwardly extending bar 41 suitably mounted in the car frame structure to reciprocate with respect thereto. Plates 42 are secured to the spaced apart sills 43 on the car, as shown in Fig. 7, these plates 42 being preferably connected by the cross portion 42ª and provided with the spaced apart lugs 42ᵇ, as shown in Fig. 7. A casing member 44 extends across between the plates 42 and is mounted between and secured against movement by the lugs 42ᵇ. This casing is provided with the dished-out grooves 44ª and is supported against downward movement by the cross strap 45 extending between and secured to the plates 42, as shown in Fig. 8. A female member 46 comprising the coacting segments 46ª is mounted to move in the casing 44, these segments 46ª being inwardly threaded and coacting as in the form described and shown in connection with the draft gear. This female member is provided with the dished-out grooves 46ᵇ located adjacent the similar grooves 44ª of the casing 44. In the races formed by the respective pairs of grooves 44ª, 46ᵇ, are located the rollers 47 shown as circular in this construction, although I may replace them with elliptic or non-circular rollers if found desirable. A follower 50 contacts with the extremity of the buffer bar 41 and is adapted to move therewith, this follower being provided with the inwardly extending sleeve 50ª forming a socket 50ᵇ, in which fits the cylindrical end 51ª of the screw member 51. The sleeve 50ª and end 51ª are so arranged as to permit considerable relative travel of the follower 50 with respect to the screw member 51. The screw member 51 is also constructed with its other end 51ᵇ cylindrical. This fits in the socket 52ª of a follower 52. This follower 52 is of a width sufficient to extend across substantially the distance between the plates 42, as is clearly shown in Fig. 7, being easily movable therebetween. A plurality of coiled springs 53 is located between the rear of the follower 52 and the cross portion 42ª of plates 42, the same being provided with the top and bottom walls 42ᶜ, 42ᵈ, respectively, extending therebetween and forming a case for these springs. Studs 52ᵇ and 42ᵉ are located on the follower 52 and cross portion 42ª, respectively, to secure the springs 53 from displacement. A coiled spring 60 is located around the screw member 51 and the sleeve 50ª, and extends between the follower 50 and one end of the female member 46. A cross strap 61 extends across between the sills 43 and is secured thereto beneath the follower 50 serving to support the same in operative position. This cross strap 61 is provided with the groove or slot 61ª therein in which slides the bottom 50ᶜ of the follower 50. The action of this buffer construction is greatly similar to that of the draft gear but is varied to meet the conditions with which it meets and, as explained above, is normally intended to resist only inward movement of the buffer bar. When shock is imparted to the buffer plate 40 it is transmitted by the bar 41 to the follower 50. This will be moved inwardly to the position shown in Fig. 12, for example, against the action of the spring 60, as will be apparent. Upon further inward movement of the follower 50 from the position shown in Fig. 12 to that shown in Fig. 13, for example, the follower 50 having contacted with the end 51ª of the screw member 50, will force the same inwardly permitting it to be screwed or twisted through the female member 46, the friction therebetween being enhanced as in the case of the draft gear construction by the wedging action between the female member 46 and the casing 44 through the movement of the rollers 47, the latter permitting a slight amount of movement of the female member prior to wedging the same. At the same time this inward travel of the screw member 51 is resisted by the action of the springs 53 operating against the follower 52. When the push has been removed from the buffer, the springs 53 and spring 60 will operate to return the mechanism to its rest or neutral position, as will be apparent.

While I have shown and described my invention with more or less particularity, I do not wish to be restricted to such showing or description beyond the scope of the appended claims, in which is defined my invention.

What I claim is:

1. In a device of the class described, means to receive and transmit buffing and pulling shocks, a male screw member, a female member coacting therewith to resist movement thereof, said female member being non-rotatably mounted and arranged for longitudinal movement under buffing or pulling shocks, and means to resist such movement of said female member.

2. In a device of the class described, means to receive and transmit buffing and pulling shocks, a male screw member, a female member coacting therewith to resist movement thereof, said female member being non-rotatably mounted and arranged for longitudinal movement under buffing or pulling shocks, and means to resist such movement of said female member, said last named means being arranged to increase the resistance afforded by said female member to movement of said male member.

3. In a device of the class described, means to receive and transmit shocks, a non-rotatable internally threaded female member mounted for longitudinal movement, a male member passing therethrough and in threaded engagement therewith whereby said female member will operate to resist longitudinal movement of said male member, and means to resist longitudinal movement of said female member.

4. In a device of the class described, in combination means to receive and transmit shocks, a male screw member, a female member coacting therewith to resist movement thereof, said female member being arranged for longitudinal movement, means to resist movement of said female member, and means to normally return all of said mechanism to rest or neutral position, said last named means also being arranged to yieldingly resist movement of said mechanism from neutral position.

5. In combination with a car having oppositely disposed lug members, shock resisting mechanism located between said lug members, said mechanism comprising a screw member, a follower located at each end thereof, a casing mounted between said lug members, a female member mounted in said casing and coacting with said screw member to resist movement thereof, said female member being threaded to engage said screw member and comprising a plurality of segments.

6. In a device of the class described, a fixed casing, a threaded female member mounted in said casing for longitudinal movement relative thereto, a screw member coacting with said female member whereby movement of the former is resisted, and means to resist the movement of said female member in said casing.

7. In a device of the class described, a fixed casing, a threaded female member mounted in said casing, a screw member coacting with said female member whereby movement of the former is resisted, and means to resist the movement of said female member in said casing, said means comprising rolls inserted between said female member and said casing, said female member being provided with an inclined seat or race for said rollers.

8. In a device of the class described, a fixed casing, a threaded female member mounted in said casing, a screw member coacting with said female member whereby movement of the former is resisted, and means to resist the movement of said female member in said casing, said means comprising rollers, said casing and female member being provided with coacting seats comprising races for said rollers, said races converging adjacent each extremity.

9. In combination, a pair of spaced apart members carried by a car or the like, lugs carried by said members and projecting into the space therebetween, a casing mounted between said lugs, a threaded female member mounted in said casing, a screw member engaging said female member, movement of the former being resisted by its engagement with the latter, a coiled spring located around said screw member, a follower at one end thereof, said spring extending between said follower and said female member and arranged to resist movement of said screw member in one direction, and a second spring member coacting with said screw member to resist movement thereof in the opposite direction, said springs being arranged to normally return said mechanism to rest or neutral position.

10. In combination with a car, a draft gear comprising a yoke, a follower at each end of said yoke, a screw member located between said followers, a threaded female member engaging and coacting with said screw member to resist movement thereof, coiled springs located around said screw member and extending from said female member to said followers.

11. In combination with a car having draft sills, cheeks or lugs carried by said sills, a casing extending between and secured against movement by said lugs, a female member movably mounted in said casing, means to resist and limit the movement in either direction of said female member in said casing, a screw member engaging and coacting with said female member whereby movement of the former will be resisted, a follower at each end of said screw member, said follower being socketed to engage and permit relative rotation and reciprocation of said screw member with respect thereto, and a coiled spring located around said screw member adjacent each end thereof, said springs extending from said female member to said followers.

12. In combination with a car having draft sills, cheeks or lugs carried by said sills, a casing extending between and secured against movement by said lugs, a female member movably mounted in said casing, means to resist and limit the movement in either direction of said female member in said casing, a screw member engaging and coacting with said female member whereby movement of the former will be resisted, a follower at each end of said screw member, said follower being socketed to engage and permit relative rotation and reciprocation of said screw member with respect thereto, coiled springs located around said screw member adjacent each end thereof, said springs extending from said female member to said followers, and a yoke secured around said followers and allied mechanism, said yoke having its ends secured to a draw-bar carried by said car.

13. In a device of the class described, in combination. a rotatable male screw member, a non-rotating threaded female member coacting therewith to resist movement thereof, and means to increase the frictional resistance between said male and female members.

In testimony whereof, I have subscribed my name.

KNUTE EDAHL.

Witnesses:
HENRY A. PARKS,
EDYTHE M. ANDERSON.